United States Patent
Bossard

(10) Patent No.: US 9,169,118 B1
(45) Date of Patent: Oct. 27, 2015

(54) HYDROGEN GAS SEPARATOR SYSTEM HAVING A MICRO-CHANNEL CONSTRUCTION WITH A TUBULAR WIRE INSERT FOR RETAINING CATALYST MATERIAL

(75) Inventor: Peter R. Bossard, Ivyland, PA (US)

(73) Assignee: SAES PURE GAS, INC., San Luis Obispo, CA (US)

( * ) Notice: Subject to any disclaimer, the term of this patent is extended or adjusted under 35 U.S.C. 154(b) by 176 days.

(21) Appl. No.: 13/101,113

(22) Filed: May 4, 2011

(51) Int. Cl.
  *B01J 19/18* (2006.01)
  *B01D 63/06* (2006.01)
  *C01B 3/00* (2006.01)
  *B01J 8/00* (2006.01)

(52) U.S. Cl.
  CPC . *C01B 3/00* (2013.01); *B01D 63/06* (2013.01); *B01D 2256/16* (2013.01); *B01J 8/009* (2013.01); *B01J 19/1812* (2013.01); *C01B 2203/10* (2013.01); *C01B 2203/1005* (2013.01)

(58) Field of Classification Search
  None
  See application file for complete search history.

(56) References Cited

U.S. PATENT DOCUMENTS

| | | | |
|---|---|---|---|
| 5,997,594 | A | 12/1999 | Edlund et al. |
| 6,461,408 | B2 | 10/2002 | Buxbaum |
| 2003/0037487 | A1* | 2/2003 | Amendola et al. ............... 48/76 |
| 2005/0158595 | A1* | 7/2005 | Marsh et al. ..................... 429/19 |
| 2006/0280662 | A1* | 12/2006 | Jang et al. ...................... 422/198 |
| 2008/0163753 | A1* | 7/2008 | Bossard et al. ................... 95/55 |
| 2009/0169446 | A1* | 7/2009 | Amendola et al. ............ 422/234 |
| 2010/0098598 | A1* | 4/2010 | Yang et al. ..................... 422/130 |
| 2010/0227286 | A1* | 9/2010 | Hockaday et al. ............ 431/170 |
| 2010/0261074 | A1* | 10/2010 | Edlund et al. ................ 429/416 |
| 2011/0265738 | A1* | 11/2011 | Ichikawa et al. .................. 123/3 |

FOREIGN PATENT DOCUMENTS

JP 2005044709 * 2/2005

* cited by examiner

*Primary Examiner* — Melvin C Mayes
*Assistant Examiner* — Sheng H Davis
(74) *Attorney, Agent, or Firm* — TIPS Group

(57) ABSTRACT

A hydrogen purification method that is used to separate hydrogen gas from a source gas. A hydrogen separator is provided that has at least one hydrogen permeable tube. A support tube is provided for each hydrogen permeable tube. A support tube is coaxially aligned with the hydrogen permeable tube, wherein a micro-channel exists between the hydrogen permeable tube and the support tube in an area of overlap. A tubular wire structure is placed within the micro-channel. The tubular wire structure is coated with catalyst material. The source gas is introduced into the micro-channel. The source gas spreads thinly past the tubular wire structure in the micro-channel. The restrictions of the micro-channel cause the source gas to embody turbulent flow characteristics as it flows. The turbulent flow causes the hydrogen separator to separate hydrogen from the source gas in a highly efficient manner.

26 Claims, 6 Drawing Sheets

HYDROGEN GAS SEPARATOR SYSTEM HAVING A MICRO-CHANNEL CONSTRUCTION WITH A TUBULAR WIRE INSERT FOR RETAINING CATALYST MATERIAL

BACKGROUND OF THE INVENTION

1. Field of the Invention

The present invention relates to systems and methods that are used to separate molecular hydrogen from a volume of gas. More particularly, the present invention is related to systems and methods that separate hydrogen from a volume of mixed gas by exposing the mixed gas to a hydrogen permeable material through which only atomic hydrogen can readily pass.

2. Prior Art Description

In industry, there are many applications for the use of molecular hydrogen. However, in many common processes that produce hydrogen, the hydrogen gas produced is not pure. Rather, when hydrogen is produced, the resultant gas is often contaminated with water vapor, hydrocarbons and/or other contaminants. In many instances, however, it is desired to have ultra pure hydrogen. In the art, ultra pure hydrogen is commonly considered to be hydrogen having purity levels of at least 99.999%. In order to achieve such purity levels, hydrogen gas must be actively separated from its contaminants.

In the prior art, one of the most common ways to purify contaminated hydrogen gas is to pass the gas through a membrane made of a hydrogen permeable material, such as palladium or a palladium alloy. As the contaminated hydrogen gas passes through the membrane, atomic hydrogen permeates through the walls of the membrane, thereby separating from the contaminants. In such prior art processes, the membrane is typically heated to at least three hundred degrees centigrade. Molecular hydrogen disassociates into atomic hydrogen on the surface of the membrane and the material of the membrane absorbs the atomic hydrogen. The atomic hydrogen permeates through the membrane from a high pressure side of the membrane to a low pressure side of the membrane. Once at the low pressure side of the membrane, the atomic hydrogen recombines to form molecular hydrogen. The molecular hydrogen that passes through the membrane can then be collected for use.

In certain types of hydrogen separators, the hydrogen permeable membrane is formed as a straight tube. For instance, in U.S. Pat. No. 5,997,594, to Edlund, entitled Steam Reformer With Internal Hydrogen Purification, a straight segment of palladium tubing is placed inside a larger tube. Gas is then caused to flow through the larger tube. Hydrogen from the gas permeates into the palladium tube, where it is collected.

The opposite configuration is shown in U.S. Pat. No. 6,461,408 to Buxbaum, entitled, Hydrogen Generator. In the Buxbaum design, a small diameter tube is placed inside a straight length of palladium tubing. Gas is introduced into the palladium tubing. Hydrogen from the gas permeates out of the palladium tubing and is collected. The remaining waste gas is removed by the small diameter tube.

In prior art systems like the ones shown in both the Edlund patent and the Buxbaum patent, gas is caused to flow either along the inside of a palladium tube or outside a palladium tube. However, in both prior art designs, the space though which the gas flows is large. This allows the gas to have a laminar flow as it passes along the length of the palladium tube. Due to the laminar flow characteristics of the passing gases, there is very little turbulence in the flowing gases. The laminar flow pattern prevents much gas from even contacting the surfaces of the palladium tube before the gases flow out of the palladium tubing. Accordingly, much of the hydrogen that may be contained in the flowing gas never has the opportunity to be absorbed by the palladium tubing. The hydrogen is merely flushed through the palladium tubing. The overall efficiency of the hydrogen separator therefore remains low.

Power & Energy, Inc., the assignee herein, has developed a line of hydrogen separators where a palladium alloy tube is positioned around a gas supply tube. The gap space in between the concentric tubes is very small. Consequently, gas flowing through the gap space flows in a turbulent fashion and results in more gas reacting with the hydrogen permeable membrane. Such hydrogen separators are exemplified By U.S. patent application Ser. No. 12/053,528, to Bossard, entitled Hydrogen Gas Separator System Having Microchannel Construction For Efficiently Separating Hydrogen Gas From A Mixed Gas Source, and U.S. Pat. No. 7,704,485 to Bossard, entitled System And Method For Processing Fuel For Use By A Fuel Cell Using A Micro-Channel Catalytic Hydrogen Separator.

A problem that has occurred with such small gap hydrogen separators is that it has proven difficult to place catalyst material within the small gap that is available. Normally, catalyst material helps separate hydrogen from larger molecules within the supply gas. However, if the catalyst is not properly applied, it can actually hamper the gas flow rate through the gap space and decrease the efficiency of the overall hydrogen separator.

A need therefore exists for a system and method of applying a catalyst in the gap space between concentric tubes of a hydrogen separator. This need is met by the present invention as described and claimed below.

SUMMARY OF THE INVENTION

The present invention is a hydrogen purification system that is used to separate hydrogen gas from a source gas. The hydrogen purification system includes a hydrogen separator into which the source gas is permitted to flow. Within the hydrogen separator is at least one hydrogen permeable tube having an open first end and a closed second end. Each hydrogen permeable tube is made of a hydrogen permeable material, such as palladium or a palladium alloy.

A support tube is provided for each hydrogen permeable tube. A support tube is coaxially aligned with the hydrogen permeable tube. A small micro-channel exists between a coaxially aligned hydrogen permeable tube and a support tube.

A tubular wire structure is placed in the micro-channel. Consequently, the tubular wire structure is coaxial with both the hydrogen permeable tube and the support tube. The tubular wire structure is made from stands of wire. The wire is either catalytic in nature or is coated with a catalyst material.

The source gas is introduced into the micro-channel. The source gas spreads thinly through the micro-channel and around the tubular wire structure. The flow restrictions caused by the dimensions of the micro-channel and the tubular wire structure cause the source gas to have turbulent flow characteristics as it flows through the micro-channel. The turbulent flow characteristics cause most every molecule of gas in the source gas to contact the catalyst material and the hydrogen permeable tube at some point within the micro-channel. Hydrogen from the source gas therefore has a high probability of passing through the hydrogen permeable tube. This significantly increases the efficiency of the hydrogen separator.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
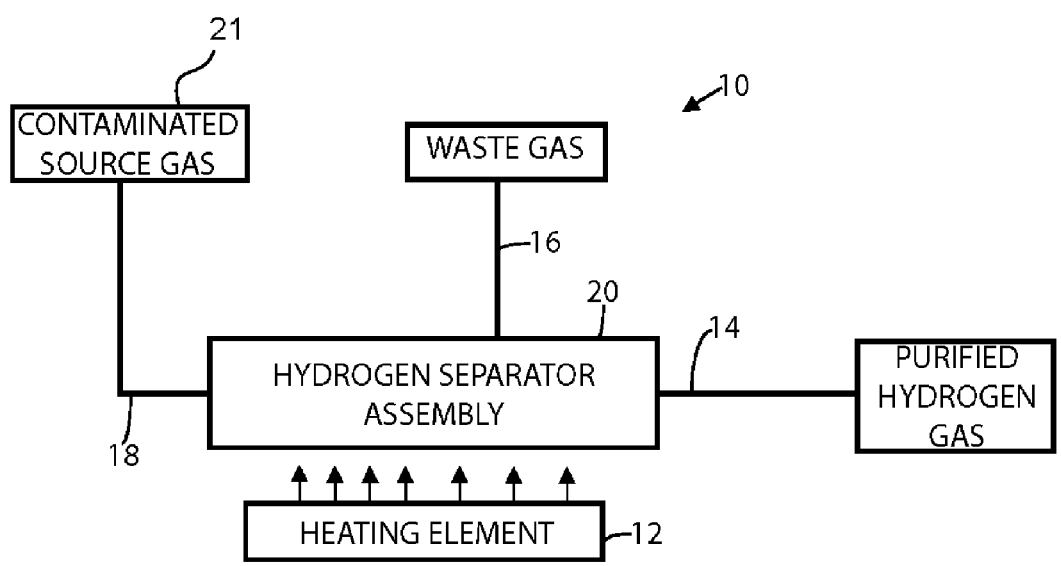
FIG. 1 is a schematic of an exemplary embodiment of a hydrogen purification system.

Referring to FIG. 1, there is shown a schematic of an exemplary embodiment of a hydrogen purification system 10 in accordance with the present invention. The hydrogen purification system 10 contains a hydrogen separator 20. The hydrogen separator 20 is coupled to a source 21 of contaminated gas that contains hydrocarbons or contaminated hydrogen gas. For example, the contaminated gas can be heated diesel fuel, ethanol, gasoline or simply hydrogen mixed with water vapor.

The hydrogen separator 20 is heated to an operating temperature by external heating elements 12. The hydrogen separator 20 separates hydrogen from the contaminated source gas, thereby producing ultra pure hydrogen and waste gas. The ultra pure hydrogen is collected though a first collection port 14. The waste gas is collected through a second waste gas collection port 16.

Figure 2:
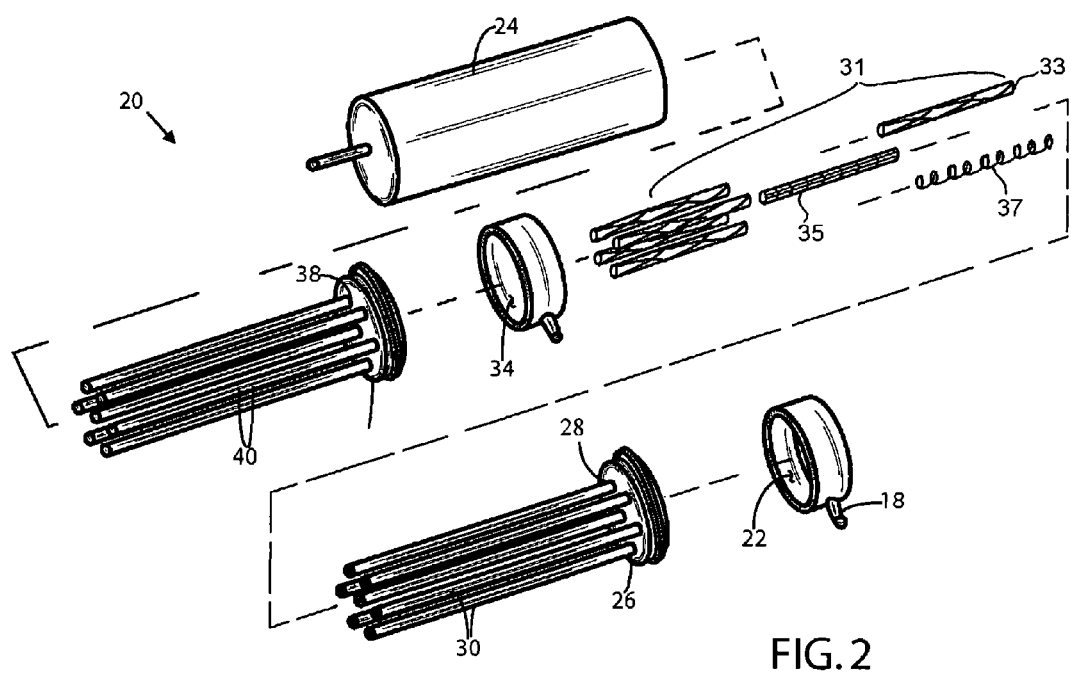
FIG. 2 is an exploded view of an exemplary hydrogen separator.

The contaminated gas enters the hydrogen separator 20 through a supply port 18. Referring to FIG. 2, in conjunction with FIG. 3, it can be seen that the supply port 18 leads into a plenum chamber 22 at one end of an enclosed housing 24. The enclosed housing 24 is preferably made of Hastelloy®, stainless steel or another high strength alloy that is non-reactive to any of the component gases contained within the contaminated source gas.

The plenum chamber 22 is defined between the interior of the enclosed housing 24 and a first perforated wall 26. The perforated wall 26 contains a plurality of holes 28 that are symmetrically arranged in a highly space efficient manner. The holes 28 are preferably spaced as densely as possible while still maintaining a predetermined minimum area of material around each of the holes 28.

A plurality of support tubes 30 extend from the first perforated wall 26. The support tubes 30 have solid walls with opposing open ends. The support tubes 30 are joined to the first perforated wall 26 at each of the holes 28. In this manner, the holes 28 communicate with the interior of the support tubes 30 and any gas flowing out of the plenum chamber 22 through the first perforated wall 26 must flow through the support tubes 30.

The support tubes 30 have a length nearly as long as the interior of the enclosed housing 24. The support tubes 30 and the perforated wall 26 are preferably made of the same non-reactive material as is the enclosed housing 24. In this manner, the first perforated wall 26 and the support tubes 30 have the same coefficient of thermal expansion as does the enclosed housing 24.

A second perforated wall 32 is disposed within the enclosed housing 24 at a point adjacent the first perforated wall 26. The second perforated wall 32 creates two additional chambers within the enclosed housing 24 in addition to the plenum chamber 22. A waste gas collection chamber 34 is created between the first perforated wall 26 and the second perforated wall 32. Lastly, a hydrogen collection chamber 36 is created between the second perforated wall 32 and the second end of the enclosed housing 24.

The second perforated wall 32 defines a plurality of holes 38 that are slightly larger than the diameter of the support tubes 30 that are extending from the first perforated wall 26. The holes 38 in the second perforated wall 32 are aligned with the support tubes 30, thereby allowing the support tubes 30 to extend through the second perforated wall 32.

A plurality of hydrogen permeable tubes 40 are coupled to the second perforated wall 32. The hydrogen permeable tubes 40 are aligned with the holes 38 in the second perforated wall 32 and pass around the support tubes 30. It will therefore be understood that the hydrogen permeable tubes 40 are coaxially aligned with the support tubes 30 and surround the support tubes 30. The hydrogen permeable tubes 40 are preferably palladium or a palladium based alloy, such as a palladium/silver alloy.

A plurality of tubular wire structures 31 are provided. Each of the tubular wire structures 31 has an outside diameter that is generally the same as the inside diameter of the hydrogen permeable tubes 40. The inside diameter of each of the tubular wire structures 31 is larger than the outside diameter of each of the support tubes 30. As a result, it will be understood that the tubular wire structures 31 pass over the support tubes 30 and inside the hydrogen permeable tubes 40.

In FIG. 2, three types of tubular wire structures 31 are shown. The first type of tubular wire structure 31 is a braided tube 33. The second type of tubular wire structure 31 is a screen tube 35. Lastly, the third type of wire structure 31 is a coiled tube 37. Referring briefly to FIG. 4 in conjunction with FIG. 2 and FIG. 3, it will be understood that all three tubular wire structures 31 are made from thin strands of wire 39. The wire 39 itself can be fabricated from a catalytic material. However, it is preferred that the strands of wire 39 be inert strands of Hastelloy® or stainless steel. The strands of wire 39 are then coated in a catalyst material 50 using a powder deposition process, an electroplating process or a vapor deposition process. The strands of wire 39 are preferably less than 50 microns thick so they can fit within the micro-channels 42 between the support tubes 30 and the surrounding hydrogen permeable tubes 40. The catalyst material 50 is preferably less than ten microns thick.

The catalyst 50 selected is dependent upon the contaminated source gas being used. For example, if the contaminated source gas is petroleum distillate, catalysts such as iron chromium oxide, copper zinc oxide and certain noble metals can be used to help break apart the complex hydrocarbons present in such a gas. The catalyst material 50 is on the tubular wire structures 31 between the support tubes 30 and the hydrogen permeable tubes 40. Consequently, the contaminated source gas is affected by the catalyst material 50 at the same time that hydrogen is being removed from the contaminant gas. Since the partial pressure of hydrogen gas will be low in the micro-channel 42, the catalyst material 50 can be more effective in helping free hydrogen molecules from the hydrocarbons in the gas.

The amount of catalyst material 50 present on the tubular wire structures 31 is largely dependent upon the surface area of wire presented by the tubular wire structures 31. The amount of wire presented by the tubular wire structures 31 is determined by the type of tubular wire stricture 31 used. The braided tube 33 uses strands of wire that are braided together into a tubular structure. This presents the highest density of wire. Consequently, it holds the most catalyst material 50. The screen tube 35 is made as a grid in the same manner as a window bug screen. The grid is closed in a loop to form the needed tube shape. This style holds a moderate amount of catalyst material 50. Lastly, the coiled tube 37 uses the least amount of wire and thus holds only a small amount of catalyst material 50.

In the embodiment of FIG. 2, the tubular wire structures 31 are shown as elements that are separate and distinct from the support tubes 30. It should be understood that the tubular wire structures 31 can be attached to the exterior of the support tubes 30 prior to the assembly of the hydrogen separator 20.

Figure 5:
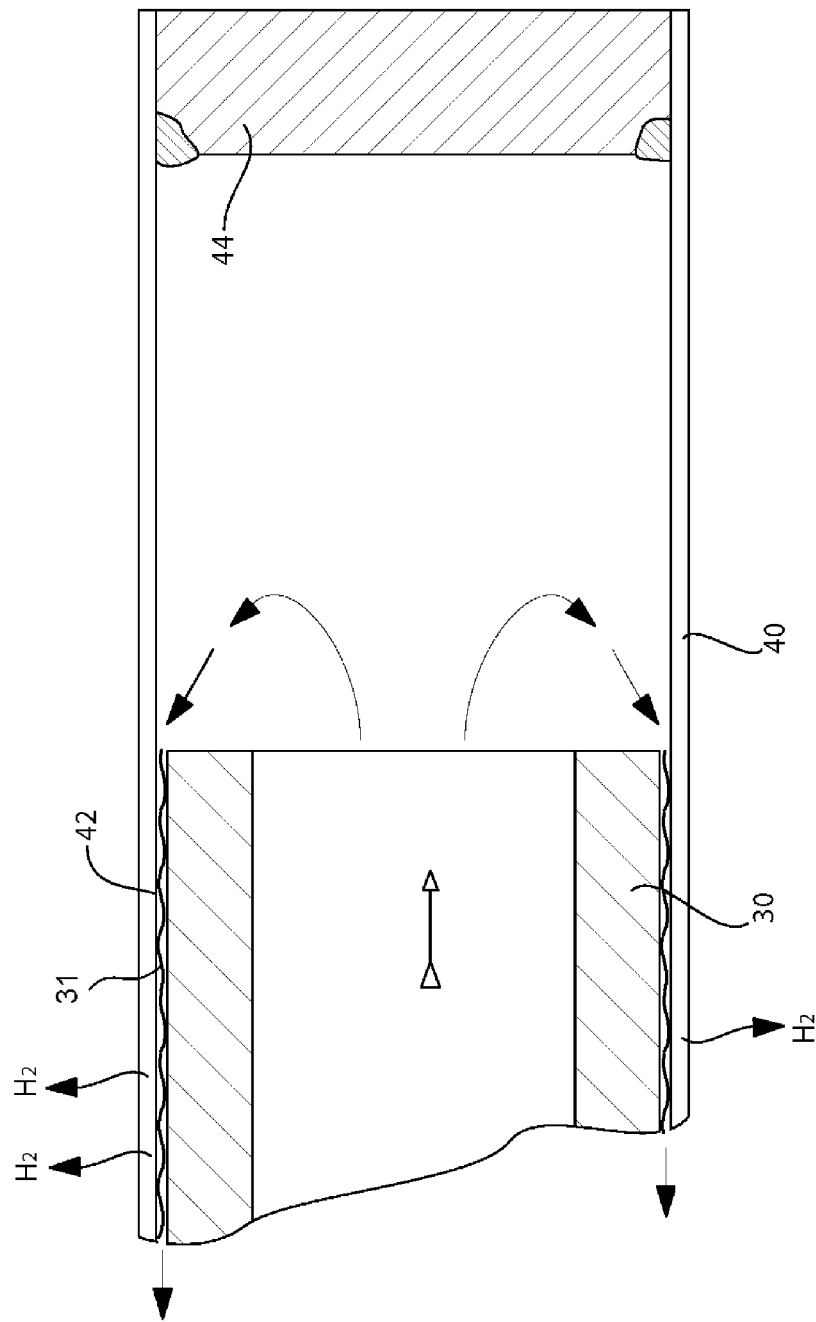
FIG. 5 is an enlarged view of section 5, shown in FIG. 3.

Referring to FIG. 5, it can be seen that the inside diameter of each hydrogen permeable tube 40 is only slightly larger than the outside diameter of each support tube 30. Consequently, a micro-channel 42 exists between the outside surface of the support tube 30 and the inside surface of the hydrogen permeable tube 40. The micro-channel 42 runs along the length of the support tube 30 in the area that the hydrogen permeable tube 40 overlaps the support tube 30. This length is preferably between three inches and twelve inches. The size of the micro-channel 42 is important to the functionality of the hydrogen separator 20. The micro-channel 42 is no larger than 300 microns and is preferably under 100 microns. The preferred flow rate of contaminant source gas through any one micro-channel 42 is preferably between two and three liters per minute. Given a micro-channel 42 this small and a flow rate this high, the contaminated source gas encounters significant friction with the outside surface of the support tubes 30 and the inside surface of the hydrogen permeable tubes 40. This friction causes the flow of the contaminant source gas to be completely turbulent within the confines of the micro-channel 42. The friction is also greatly increased by the presence of the tubular wire structures 31. The tubular wire structures 31 partially fill the micro-channels 42. However, the tubular wire structures 31 do not seal the micro-channels 42. Consequently, gas flows over, under and around the various wire strands that comprise the tubular wire structures 31. This adds greatly to the turbulence of the gas flow through the micro-channel 42. Since the flow of the contaminant source gas is turbulent in the micro-channel 42, there exist no significant channels of laminar flow that can sweep the contaminant source gas through the micro-channel 42 without encountering the inside surface of the hydrogen permeable tube 40 and the catalyst material. Rather, due to the turbulent flow of the contaminant gas within the micro-channel 42, there exist many eddies and flow undulations. As a consequence, nearly every hydrogen molecule contained within the contaminant source gas has a high statistical probability of contacting the catalyst material and the inside surface of the hydrogen permeable tube 40. Furthermore, due to the turbulent flow of the contaminant source gas, each hydrogen molecule impacts the inside surface of the hydrogen permeable tube with more energy. Consequently, it is more probable that the hydrogen molecules react with the hydrogen permeable tube 40 and pass through the hydrogen permeable tube 40.

It should be further understood that by providing a very small micro-channel 42, the contaminant source gas is caused to spread very thin as it experiences turbulent flow. The time it takes gas within the micro-channel 42 to reach the hydrogen permeable tube 40 is generally proportional to the square of the micro-channel size. Consequently, by keeping the micro-channel 42 very small, the time it takes hydrogen gas to expose itself to the hydrogen permeable tube 40 remains small. This allows a short and relatively inexpensive hydrogen permeable tube 40 to be used with better efficiencies than are available from long prior art tubes.

The hydrogen permeable tubes 40 are longer than the support tubes 30 they surround. The free ends of the hydrogen permeable tubes 40 are closed. Preferably, the free ends of the hydrogen permeable tubes 40 are not pitched and brazed. Such terminations do not last well with repeating expansion and contraction cycles. In the shown embodiment, an internal end cap 44 is provided. The internal end cap enables the hydrogen permeable tube 40 to be sealed while maintaining its round tubular shape. An internal end cap 44 is internally brazed in place at the end of each of the hydrogen permeable tubes 40. The end caps 44 are preferably brazed to the inside of the hydrogen permeable tubes 40. In this manner, the end caps 44 do not restrict the hydrogen permeable tubes 40 from expanding outwardly when heated and saturated with molecular hydrogen.

The capped ends of each of the hydrogen permeable tubes 40 is also a predetermined distance from the end 45 (FIG. 2) of the enclosed housing 24 (FIG. 2). The predetermined distance is greater than any change in length of the hydrogen permeable tubes 40 caused by temperature and hydrogen swelling. In this manner, the hydrogen permeable tubes 40 are free to expand without restriction.

The hydrogen permeable tubes 40 are straight. Consequently, mechanical stresses caused by differences in thermal and hydrogen expansion between the membrane and its support are eliminated. The hydrogen permeable tubes 40 are supported at one, and only one, fixed point along the length of each tube. This basic concept allows the hydrogen permeable tube 40 to expand freely under varying temperature and hydrogen absorption conditions.

Figure 3:
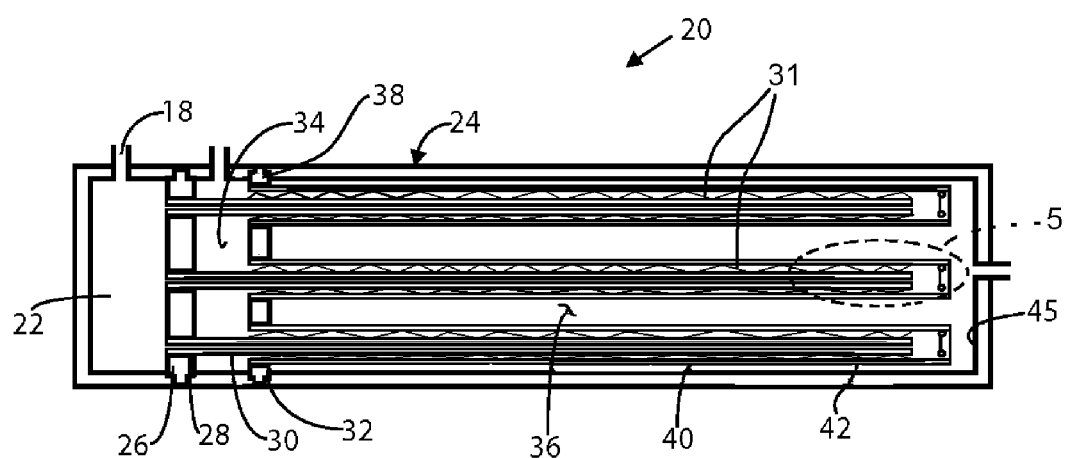
FIG. 3 is a cross-sectional view of the hydrogen separator shown in FIG. 2.
Figure 4:
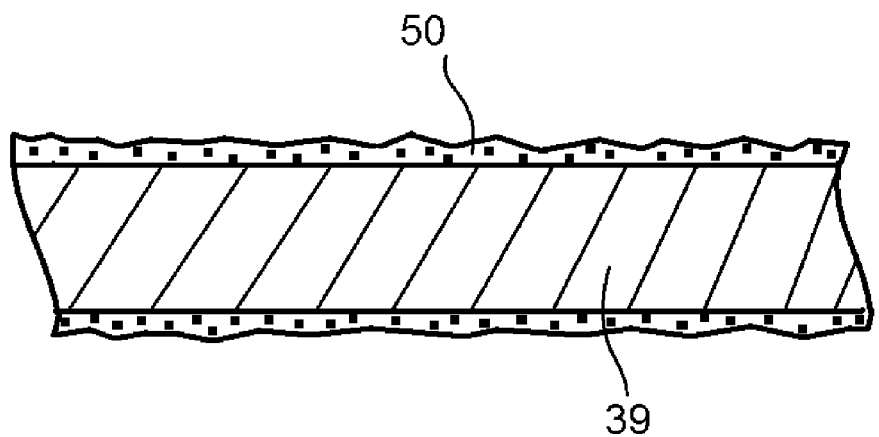
FIG. 4 is an enlarged cross-sectional view of a segment of a stand of wire used in the fabrication of the tubular wire structures.

Referring back to both FIG. 2 in conjunction with FIG. 3 and FIG. 5, it will be understood that in operation, the enclosed housing 24 and all its contents are heated to an operating temperature in excess of 300 degrees Centigrade. A contaminated supply gas is introduced into the plenum chamber 22. The contaminated gas fills the plenum chamber 22 and flows into the support tubes 30 through the first perforated wall 26. The contaminated gas exits the far end of the support tubes 30 and is forced to flow through the micro-channel 42 that exists between the exterior of the support tubes 30 and the interior of the surrounding hydrogen permeable tubes 40. The contaminated supply gas travels through the micro-channel 42 and around the tubular wire structures 31 with turbulent flow characteristics. The micro-channel 42 drains into the waste gas collection chamber 34. However, as the contaminated source gas flows through the micro-channel 42, the flowing gas spreads thinly and turbulently around the strands of wire 39 of the tubular wire structures 31 and over the outside surfaces of the hydrogen permeable tubes 40. The flowing gas reacts with the catalyst material 50 on the tubular wire structures 31. The length and width of the micro-channel 42, as well as the gas flow rate, are engineered to maximize the efficiency at which the hydrogen gas permeates through the hydrogen permeable tubes 40. By spreading the contaminated gas thinly and turbulently over the surfaces of the hydrogen permeable tubes 40, the hydrogen contained within the contaminated gas does not have to diffuse far before it contacts hydrogen permeable material. In this manner, a high percentage of the hydrogen available in the contaminated gas is provided with the opportunity to disassociate from the contaminated gas and pass through the hydrogen permeable tubes 40. Depending upon operating parameters, a hydrogen diffusion efficiency in excess of eighty percent can be achieved.

As hydrogen gas passes through the hydrogen permeable tubes 40, the hydrogen gas passes into the collection chamber 36 of the enclosed housing 24. The hydrogen gas in the collection chamber 36 is then drawn out of the collection chamber 36 for use. The hydrogen gas is ultra pure, being that only molecular hydrogen is capable of dissociating from the contaminated source gas and pass through the hydrogen permeable tubes 40.

The non-hydrogen components of the contaminated source gas flow through the micro-channels 42 and into the waste gas collection chamber 34. The waste gas is then drawn out of the hydrogen separator 20. The pressure of the hydrogen collection chamber 36 is kept lower than the pressure of the waste gas collection chamber 34. In this manner, there is a positive pressure differential between the micro-channel 42 and the hydrogen collection chamber 36 that encourages the flow of hydrogen through the hydrogen permeable tubes 40 and into the hydrogen collection chamber 36.

The micro-channel 42 is created by the coaxial positioning of the support tubes 30 within the hydrogen permeable tubes 40. The tubular wire structures 31 are also coaxially positioned, therein the tubular wire structures 31 are interposed between the support tubes 30 and the hydrogen permeable tubes 40. However, other advantages are created by such structuring. During normal operation, the hydrogen permeable tubes 40 are internally pressurized, and therefore expand outwardly away from the inner support tubes 30. However, if the hydrogen separator 20 is ever reverse pressurized, either by accident or purposely for cleaning, the hydrogen permeable tubes 40 are externally pressurized and are caused to contract upon the support tubes 30. The micro-channel 42 is very small and enables the hydrogen permeable tubes 40 to contact the tubular wire support structures 31 without being damaged. The tubular wire support structures 31 rest upon the support tubes 30 and provide structural integrity to the hydrogen permeable tubes 40 and prevent the hydrogen permeable tubes 40 from collapsing. The positioning of the tubular wire structures 31 in the hydrogen permeable tubes 40 therefore makes the overall hydrogen separator 20 far more resistant to damage from reverse pressurization.

Figure 6:
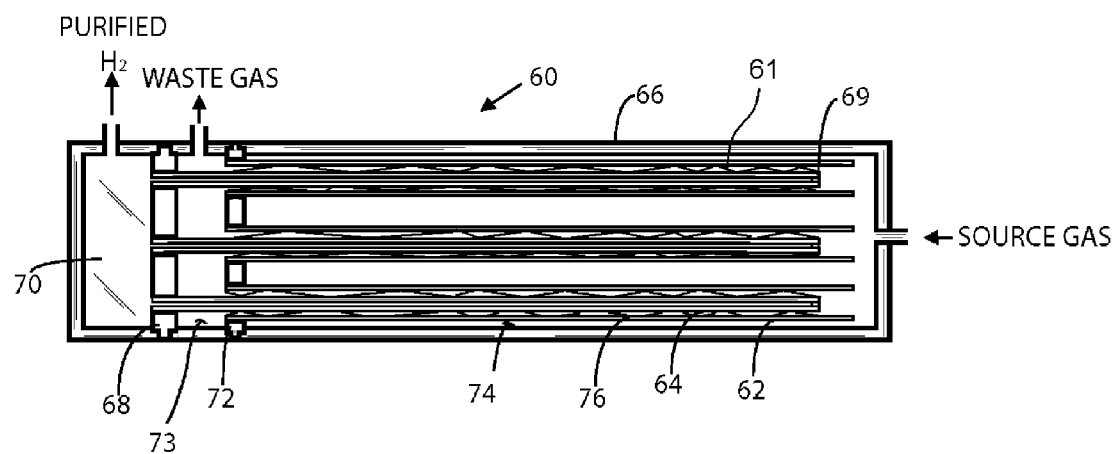
FIG. 6 is a cross-sectional view of an alternate embodiment of a hydrogen separator.

In the embodiments of the present invention thus shown, hydrogen permeable tubes 40 are placed around support tubes 30. Contaminated source gas is then allowed to flow between the support tubes 30 and the hydrogen permeable tubes 40. Referring now to FIG. 6, an alternate embodiment of a hydrogen separator 60 is shown, where support tubes 62 are placed around the outside of hydrogen permeable tubes 64. Again, tubular wire structures 61 are placed between the support tubes 62 and the hydrogen permeable tubes 64.

In this embodiment, there is an enclosed housing 66. Hydrogen permeable tubes 64 extend from a first perforated wall 68 within the enclosed housing 66. The hydrogen permeable tubes 64 have capped ends 69. A collection chamber 70 is formed between the end of the enclosed housing 66 and the first perforated wall 68. The collection chamber 70 communicates with the interior of the hydrogen permeable tubes 64.

A second perforated wall 72 is positioned within the enclosed housing 66. A waste gas collection chamber 73 is formed between the first perforated wall 68 and the second perforated wall 72. A plurality of support tubes 62 extend from the second perforated wall 72. The support tubes 62 are aligned with the hydrogen permeable tubes 64 and surround both the tubular wire structures 61 and the hydrogen permeable tubes 64.

A plenum chamber 74 is formed between the second perforated wall 72 and the far end of the enclosed housing 66. Contaminated source gas is introduced into the plenum chamber 74. The contaminated source gas flows into the support tubes 62 and through a micro-channel 76 that separates the support tubes 62 from the interior hydrogen permeable tubes 64. The tubular wire structures 61 are present in the micro-channel 76. Hydrogen gas passes through the material of the hydrogen permeable tubes 64 as it turbulently flows through the micro-channels 76 and past the tubular wire structures 61. The hydrogen gas passing into the hydrogen permeable tubes 64 is collected in the collection chamber 70. Waste gas that flows through the micro-channels 76 is collected in a waste gas chamber 78 and is removed from the hydrogen separator 60.

It will be understood that the embodiments of the hydrogen separators that are shown are merely exemplary and that a person skilled in the art can make many changes to the shown embodiments. For example, the shown embodiments only have a few support tubes and hydrogen permeable tubes. It will be understood that embodiments of the present invention can be made where hundreds of such tubes are used. It will further be understood that hydrogen permeable tubes can be positioned either inside or outside support tubes, provided a micro-channel exists between the support tubes and the hydrogen permeable tubes and the tubular wire structures are present in the micro-channels. Furthermore, the catalysts used on the tubular wire structures depend upon the type of gas composition being used as the contaminated source gas. All such variations, modifications and alternate embodiments are intended to be included within the present invention as defined by the claims.

What is claimed is:

1. A hydrogen separator comprising:
an outer tube having a round, tubular shape, the outer tube having a first end, a second end, and an inside diameter;
an inner tube having a round, tubular shape, wherein the inner tube is coaxially disposed within the outer tube, wherein the inner tube has a first end, a second end, and an outside diameter, and wherein the difference between the outside diameter of the inner tube and the inside diameter of the outer tube is no greater than 300 microns, whereby a micro-channel is provided between the inner tube and the outer tube; and
a tubular wire structure having a round, tubular shape coaxially disposed at least partially within the micro-channel with respect to the inner tube and the outer tube;
wherein one of the outer tube and the inner tube comprises a hydrogen permeable material that is capped at one end, the other of the outer tube and the inner tube comprises a non-reactive alloy and is open at both ends, and the tubular wire structure comprises a catalyst material.

2. A hydrogen separator as recited in claim 1 wherein the tubular wire structure is coaxial with both the inner tube and the outer tube.

3. A hydrogen separator as recited in claim 2 wherein the tubular wire structure comprises at least one strand of wire.

4. A hydrogen separator as recited in claim 3 wherein the at least one strand of wire comprises the catalyst material.

5. A hydrogen separator as recited in claim 3 wherein the at least one strand of wire comprises a wire made from a non-reactive material at least partially covered with the catalyst material.

6. A hydrogen separator as recited in claim 5 wherein the catalyst material coats the wire.

7. A hydrogen separator as recited in claim 6 wherein the wire is less than 50 microns thick and the catalyst material is less than 10 microns thick.

8. A hydrogen separator as recited in claim 1 wherein the tubular wire structure comprises at least one of a braided tube, a screened tube and a coiled tube.

9. A hydrogen separator as recited in claim 1 wherein the tubular wire structure is attached to the inner tube.

10. A hydrogen separator as recited in claim 1 wherein the hydrogen permeable material comprises at least one of palladium and a palladium alloy.

11. A hydrogen separator as recited in claim 10 wherein the non-reactive alloy comprises stainless steel.

12. A hydrogen separator as recited in claim 1 wherein the micro-channel is between three and twelve inches in length.

13. A hydrogen separator assembly comprising:
an enclosed housing;
a hydrogen separator disposed within the enclosed housing and including:
(a) an outer tube having an inside diameter;
(b) an inner tube at least partially coaxially disposed within the outer tube and having an outside diameter, wherein the difference between the outside diameter of the inner tube and the inside diameter of the outer tube is no greater than 300 microns, whereby a micro-channel is provided between the inner tube and the outer tube; and
(c) a tubular wire structure disposed at least partially within the micro-channel, wherein one of the outer tube and the inner tube comprises a hydrogen permeable material that is capped at one end, the other of the outer tube and the inner tube comprises a non-reactive alloy and is open at both ends, and the tubular wire structure comprises a catalyst material; and
at least one heating element provided externally to the housing and operative to heat the hydrogen separator to at least 300 degrees centigrade.

14. A hydrogen separator assembly as recited in claim 13 wherein the hydrogen separator is one of a plurality of hydrogen separators disposed within the housing.

15. A hydrogen separator assembly as recited in claim 14 further comprising a first perforated wall provided with a plurality of holes which are engaged with end portions of the inner tubes of the plurality of hydrogen separators.

16. A hydrogen separator assembly as recited in claim 15 further comprising a second perforated wall provided with a plurality of holes which are engaged with end portions of the outer tubes of the plurality of hydrogen separators.

17. A hydrogen separator assembly as recited in claim 16 wherein the first perforated wall is disposed proximate to a first end of the housing to define a first chamber between the first perforated wall and the first end of the housing.

18. A hydrogen separator assembly as recited in claim 17 wherein the second perforated wall is disposed between the first perforated wall and a second end of the housing to define a second chamber between the first perforated wall and the second perforated wall and a third chamber between the second perforated wall and the second end of the housing.

19. A hydrogen separator assembly as recited in claim 18 wherein the tubular wire structure comprises at least one of a braided tube, a screened tube and a coiled tube.

20. A hydrogen separator assembly as recited in claim 18 wherein the tubular wire structure is attached to the inner tube.

21. A hydrogen separator assembly as recited in claim 18 wherein the hydrogen permeable material comprises at least one of palladium and a palladium alloy, and wherein the non-reactive alloy comprises stainless steel.

22. A hydrogen separator assembly as recited in claim 21 wherein the inner tube of each of the plurality of hydrogen separators comprises stainless steel and the outer tube of each of the plurality of hydrogen separators comprises at least one of palladium and a palladium alloy.

23. A hydrogen separator assembly as recited in claim 22 wherein the uncapped ends of the outer tubes of the plurality of hydrogen separators are engaged with the plurality of holes of the second perforated wall, whereby the first chamber comprises a plenum chamber, the second chamber comprises a waste gas collection chamber, and the third chamber comprises a hydrogen collection chamber.

24. A hydrogen separator assembly as recited in claim 23 wherein the housing is provided with a supply port communicating with the plenum chamber, a collection port communicating with the hydrogen collection chamber, and a waste collection port communicating with the waste gas collection chamber.

25. A hydrogen separator assembly as recited in claim 21 wherein inner tube of each of the plurality of hydrogen separators comprises at least one of palladium and a palladium alloy and the outer tube of each of the plurality of hydrogen separators comprises stainless steel.

26. A hydrogen separator assembly as recited in claim 25 wherein the uncapped ends of the inner tubes of the plurality of hydrogen separators are engaged with the plurality of holes of the first perforated wall, whereby the first chamber comprises a hydrogen collection chamber, the second chamber comprises a waste gas collection chamber, and the third chamber comprises a plenum chamber.

\* \* \* \* \*